Oct. 8, 1957 P. A. CHOMBARD 2,808,726
DEVICE FOR RESETTING A GYROSCOPE
Filed March 1, 1955 2 Sheets-Sheet 1

INVENTOR
P. A. CHOMBARD
By Wilkinson & Mawhinney
ATTYS

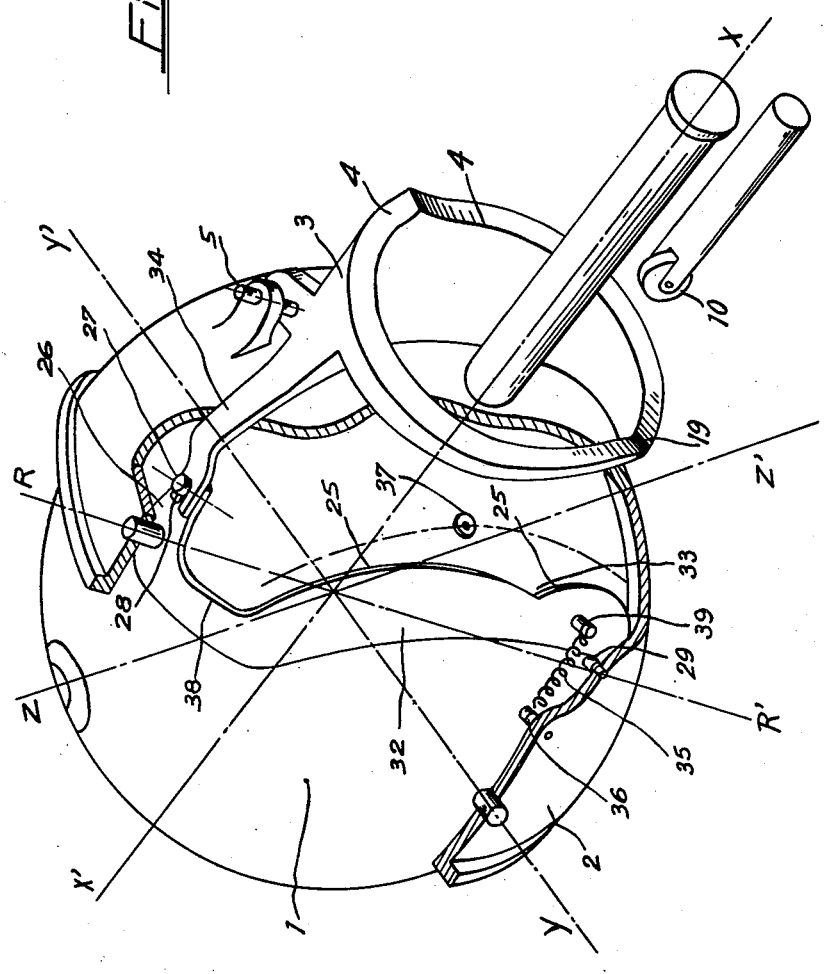

United States Patent Office 2,808,726
Patented Oct. 8, 1957

2,808,726
DEVICE FOR RESETTING A GYROSCOPE

Pierre André Chombard, Boulogne-sur-Seine, France, assignor to Etat Francais, represented by Monsieur l'Ingenieur General Mazer, acting on behalf of the Secretary of State for Armed Forces (Air), Paris, France Application March 1, 1955, Serial No. 491,471

Claims priority, application France March 2, 1954

9 Claims. (Cl. 74—5.1)

The present invention refers to a device for resetting a gyroscope.

Gyroscopes having complete freedom, for instance those used in vertical-indicating gyroscopes, when mounted for example on an aircraft, are likely to be disturbed by the evolutions which lead to the suppression of one of the three degrees of freedom by putting two axes in coincidence, or which cause the abutments often provided for preventing this coincidence to be actuated.

After such a disturbance, the resetting of the gyroscope by means of the erector which causes the axis of said gyroscope to follow up the vertical is usually too slow to permit use of the gyroscope again within a very short time, as is desirable.

Two methods are generally used to overcome such a drawback.

The first method consists in temporarily increasing the speed of action of the erector.

The second method consists in acting by mechanical means on the gyroscope unit in order to lock it with respect to the aircraft in a position generally corresponding to perpendicular gimbal rings, so that the gyroscope spindle is substantially vertical when the aircraft is in horizontal flight.

The first method does not suit all the modes of erection and it is always carried out with much difficulty in as much as the gyroscope spindle is brought back to the vertical position only when the aircraft has a uniform straight motion at the moment of operating the erector device.

The second method brings back the gyroscope spindle to the vertical position only if the pilot is able to bring the aircraft into the right position. It often has the drawback either of subjecting the gyroscope to violent stress prejudicial to its preservation, or of being efficient only for disturbances of a limited amplitude.

It is difficult to claim an advantage of principle for either of these methods, the efficiency of which depends very much on the conditions under which the pilot is led to use them.

The device forming the object of the present invention derives from the second method. Its object, and this is its main advantage, is to lock in a very short time the gyroscope together with its gimbal suspension with respect to the casing containing the gyroscope and its suspension, without the said gyroscope being subjected to abnormal shocks and whatever be the amplitude of the disturbances.

It essentially comprises two units, viz: a first unit for bringing the outer gimbal ring into a location which is predetermined with respect to the casing, and for keeping it in such location, and a second unit for bringing the inner gimbal ring into a location which is predetermined with respect to the outer gimbal ring, and for keeping it in such location the second unit being directly actuated by the first unit by means having an element that passes through the outer gimbal ring, the first unit being itself actuated by appropriate control means.

The first unit comprises two members, viz: a roller movable with respect to the casing in a direction substantially parallel to the axis of the outer ring and a cylindrical cam pivoting about a spindle mounted on the outer ring and perpendicular to the axis of the latter, the cylindrical body of the cam being a body of revolution, the profile of the cylindrical cam comprising two parts symmetrical with respect to a diametral plane and the slope of said profile having a constant direction from a point of discontinuity forming a hollow to another point of discontinuity forming an apex, so that, when the roller presses against the cam, the latter will turn and carry the outer ring about its spindle, until the roller is wedged in the hollow of the profile, the location of the said hollow on the profile defining the resetting position of the outer ring.

The second unit comprises two members similar to those of the first one, viz: a roller and a curvilinear cam, one of them being connected to the inner ring, the other, to the cylindrical cam by means, an element of which passes through the outer ring, the profile of the curvilinear cam comprising two parts symmetrical with respect to a plane containing the axis of the inner ring, the slope of the said profile having a constant direction until a point of discontinuity forming a hollow, so that, when pressed one against the other, the roller and the cam will move with respect to each other, one of these members carrying the inner ring to which it is connected, until the roller is wedged in the hollow of the cam profile, the location of the said hollow on the profile defining the resetting position of the inner ring.

The device for resetting also comprises a spring arranged between the outer ring and the mobile member of one of the two units for separating the members of the second unit from each other as soon as the control means are no longer actuated, and an abutment integral with the outer ring, for limiting the space between the members of the second unit under the action of the spring.

The control means are actuated from the outside by the operator, either by hand or by any suitable motor.

The characteristics and advantages of the device for resetting a gyroscope according to the invention will be apparent from the following description.

Two specific embodiments will be described in reference to the accompanying drawings in which:

Fig. 3 is a perspective view of another embodiment of the device.

Figure 1:
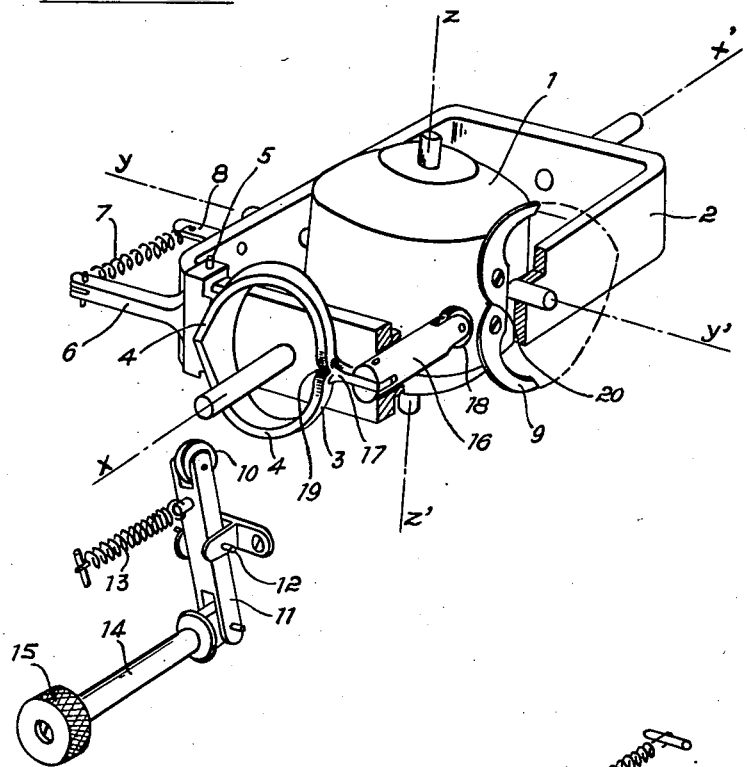
Fig. 1 is a perspective view of a first embodiment of the resetting device.

It is to be pointed out that the two embodiments of the resetting device according to the invention, as hereinafter described and as illustrated both correspond, for the sake of clearness of the drawing and of the description, to the non-exclusive specific instance in which the hollow of the cam profile of the first unit is in the plane of the axes of the two rings and the hollow of the cam profile of the second unit is in the plane comprising the axis of the inner ring and perpendicular to the axis ZZ' of the gyroscope.

In Fig. 1, the gyroscope is contained in a housing 1 and rotates about axis ZZ'—this housing 1 rotates about axis YY' in a frame 2 which in its turn rotates about axis XX'. The housing 1 and the frame 2 respectively illustrate the inner and outer rings of the gimbal suspension of a vertical-indicating gyroscope used in an aircraft.

A cylindrical cam 3, the body of which is of revolution and coaxial with axis XX', pivots about a pin 5, integral with frame 2. It comprises a double profile constituted by two helicoidal surfaces 4 of equal and opposite pitches.

Axis XX' is parallel to a plane of reference defining the horizontal plane on board the aircraft in which is mounted the vertical-indicating gyroscope. Pin 5 is perpendicular to the median plane of the frame 2, which is coincident with plane XX', YY'.

Cam 3, extended by the arm 6, is kept in its position of rest on the one hand by means of the traction spring 7, mounted between said arm 6 and a support 8 secured to frame 2, and on the other hand by an abutment limiting the action of spring 7, not shown in Fig. 1.

A heart-shaped cam 9, centered on axis YY', is secured to the housing 1. It may be either complete, as illustrated in full lines and dot-and-dash lines, if the freedom about the axis YY' is complete, or limited to its useful portions, as illustrated in full lines, if the free motion of the gyroscope housing 1 about axis YY' is limited by abutments.

A roller 10 is mounted on the extremity of a lever 11, pivoting about a spindle 12 carried by the housing of the vertical-indicating gyroscope. This lever 11 is drawn by a spring 13 (the latter being secured to said housing) and pivots at one end of a control rod 14, the other end of which is provided with a milled knob 15 within the operator's reach.

Roller 10 is located close to cylindrical cam 3. For the sake of clearness the distance between the roller 10 and the cam 3 has been exaggerated in Fig. 1.

A rod 16 is linked to a part 17 secured to cam 3. It passes through the frame 2 and is provided with a roller 18 at its other end.

The hollow or re-entrant portion of the profile of the cylindrical cam 3 is advantageously marked by a notch 19. This hollow is located preferably, but not compulsorily, as shown in Fig. 1, in the plane perpendicular to spindle 5 and containing axis XX', i. e. in the plane defined by axes XX', YY'. The position of roller 10 is such that, when it is located in the notch 19, axis YY' is parallel to the horizontal reference plane of the aircraft.

This device operates as follows:

After the aircraft has carried out evolutions likely to render inaccurate the indications given by the vertical-indicating gyroscope, the operator grasps milled knob 15 and pulls on the control rod 14; lever 11 is caused to rotate about its spindle 12 and roller 10 exerts a pressure on one of the profiles 4 of the cylindrical cam 3. Said cam 3 rotates about spindle 5, thus causing, by displacing rod 16 through frame 2, roller 18 to come into contact with the heart-shaped cam 9. The stress exerted by the roller 18 on the cam 9 is applied on the spindle YY' between the two bearings of the latter. The stresses on these bearings are thus minimum. The gyroscope is thus submitted to torques about its two axes XX', YY' and has a precession movement until roller 10 comes into the hollow 19 and roller 18 into the hollow 20. The spindles YY' and ZZ' then come to rest with respect to the aircraft and are mutually at right angles, the planes of axes XX' and YY' being parallel to the horizontal reference plane of the aircraft.

The operator has only to release the milled knob 15 to free the gyroscope in this position.

Figure 2:
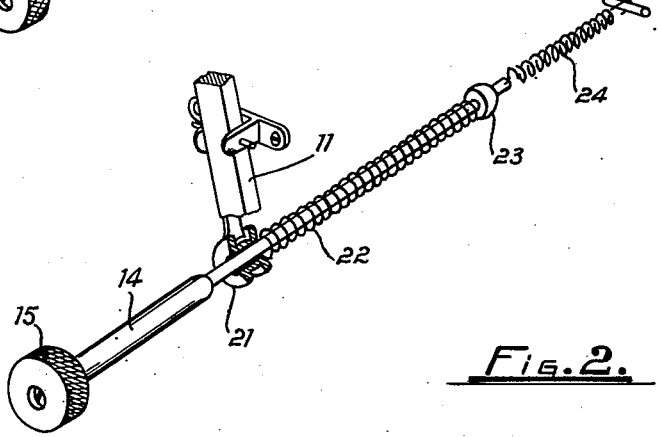
Fig. 2 is a perspective view of a modified form of the means for controlling this device.

Another embodiment of control rod 14 of lever 11 is shown in Fig. 2. Said rod 14 is no longer directly linked to lever 11, but acts upon the latter through the instrumentality of block 21 sliding on rod 14 under the action of a spring 22 bearing against a shoulder 23. The extension of rod 14 is connected to the casing of the vertical-indicating gyroscope by means of a spring 24.

By pulling on the rod 14, spring 24 is extended and spring 22, being compressed, actuates lever 11 through the instrumentality of block 21. By releasing the rod 14, the device comes back to its position of rest under the action of spring 24.

In Fig. 3, the housing 1, within which the gyroscope proper is to be found, rotates about axis YY' in the half-housing 2, rotating in its turn about axis XX'.

Housing 1 and half-housing 2 respectively constitute the inner and outer rings of the gimbal suspension of the gyroscope.

A cylindrical cam 3, the body of revolution of which is coaxial with axis XX', pivots about a spindle 5 secured to half-housing 2. Said cam comprises a double profile constituted by two helicoidal surfaces 4, of equal and opposite pitches. Spindle 5 is at right angles to plane XX', YY'.

A cam 32, cut out of a spherical surface, pivots in half-housing 2 about a spindle RR' parallel to spindle 5. It comprises two symmetrical profiles 25, the slopes of which are directed towards the hollow 33 situated in the plane XX', YY'. Cam 32 comprises an arm 26, the spindle 27 of which is located in a slot 28 of a lever 34 integral with cam 3.

Cam 32 and cam 3 are maintained in their position of rest on the one hand by a spring 35 applied between a finger 39, secured to cam 32, and a finger 36, secured to the half-housing 2, and on the other hand by an abutment 29, also integral with the half-housing 2.

A roller 37, secured to the housing 1, limits the movements of the gyroscope about axis YY' by abutting on edges 38 of cam 32 and allows the device to be reset by means of the profiles 25 of cam 32.

Roller 10, acting upon the inclines 4 of cam 3, is controlled by devices similar to those described in the above embodiment and not illustrated in Fig. 3. However, it is to be pointed out that this control cannot only be made by hand by the operator, but also be controlled at a distance by means of any suitable motor.

The device operates as follows:

In order to effect the resetting, roller 10 is pushed forward by means of the above device and it exerts a pressure on one of the inclines 4 of the cylindrical cam 3. Said cam rotates about spindle 5, thus causing cam 32 to rotate about the spindle RR' by means of spindle 27 and to come in contact with roller 37. The gyroscope is thus subjected to torques about its two axes XX' and YY' and has a precession movement until roller 10 comes into the hollow 19 and roller 37 into the hollow 33.

The resetting device according to the invention operates in a continuous manner so that the final position is reached without abruptly stopping the spindles.

Moreover, as in the device shown at Fig. 1, the stress exerted by the cam 32 on the roller 37 is applied on the spindle YY' between the two bearings of the latter. The stresses on these bearings are thus minimum.

If necessary, there can be added to this device a locking mechanism, obtained by any known means, e. g. a hooking action by rotating milled knob 15, in order that the operator may, if desired, keep the two gimbal suspension rings stationary although the said milled knob 15 is released.

Of course, the invention has been described and illustrated only by way of non-limitative example, and changes of detail can be made therein without departing from its scope.

I claim:

1. Device for resetting a gimbal suspension gyroscope located in a casing comprising a first unit for bringing the outer gimbal ring into a position which is predetermined with respect to the casing and keeping it in such position, constituted by two members, viz: a roller movable with respect to the casing in a direction substantially parallel to the axis of the outer ring and a cylindrical cam, pivoting about a spindle mounted on the outer ring and perpendicular to the axis of the latter, the cylindrical body of this cam being a body of revolution, the profile of the cylindrical cam comprising two parts which are symmetrical with respect to a diametral plane and the slope of said profile having a constant direction from a point of discontinuity forming a hollow to another point of discontinuity forming an apex, a second unit for bringing the inner ring into a position predetermined with respect to the outer ring, and keeping it there, constituted as the first unit, by two members, viz: a roller and a curvilinear cam, one of these members being connected to the inner ring, the other being connected to the cylindrical cam of the first unit by means, an element of which passes through the outer ring, the profile of the curvilinear cam comprising two parts symmetrical with respect to a plane comprising the axis of the inner ring, the slope of said profile having a constant direction until a point of discontinuity forming a hollow, control means actuated from the outside, comprising a part pressing on the roller of the first unit so that the said roller will itself press on the cylindrical cam connected to the outer ring, the said cylindrical cam pressing in its turn on the members of the second unit, a spring positioned between the mobile member of one of the two units and the outer ring for separating the members of the second units from each other as soon as the control means are no longer actuated, thus freeing the two rings each being locked in the position defined by the location of the hollow of the profile of the corresponding cam, and an abutment for limiting the amplitude of the spacing between the members of the second unit under the action of the spring.

2. Resetting device according to claim 1, in which the roller of the first unit is mounted at the extremity of a lever pivoting about a spindle supported by the casing.

3. Resetting device according to claim 2, in which the second unit is constituted by at least a part of a heart-shaped cam mounted on the spindle of the inner ring and by a roller mounted at the extremity of a rod sliding through the outer ring and linked at its other extremity to a member integral with the cylindrical cam pivoting with respect to the outer ring.

4. Resetting device according to claim 1, in which a spring is provided between the cylindrical cam and the outer ring, for separating the roller and the heart-shaped cam when the resetting device is not being operated, an abutment arranged between the cylindrical cam and the outer ring, limiting the space between the roller and the heart-shaped cam.

5. Device for resetting a gyroscope located in a casing and suspended by means of two gimbal rings respectively inscribable in a sphere, comprising a first unit for bringing the outer gimbal ring into a position which is predetermined with respect to the casing, and keeping it in such position, constituted by two members, viz: a roller movable with respect to the casing in a direction substantially parallel to the axis of the outer ring and a cylindrical cam pivoting about a spindle mounted on the outer ring and perpendicular to the axis of the latter, the cylindrical body of this cam being a body of revolution, the profile of the cylindrical cam comprising two parts which are symmetrical with respect to a diametral plane and the slope of said profile having a constant direction from a point of discontinuity forming a hollow to another point of discontinuity forming an apex, a second unit for bringing the inner ring into a predetermined position with respect to the outer ring, and keeping it in such position, constituted by two members, viz: a roller and a curvilinear cam located between the two spherical rings and cut out of a spherical surface, one of these members being connected to the inner ring, the other being connected to the cylindrical cam by means, an element of which passes through the outer ring, the profile of the curvilinear cam comprising two parts which are symmetrical with respect to a plane comprising the axis of the inner ring, the slope of said profile having a constant direction until a point of discontinuity forming a hollow, control means actuated from the outside comprising a part pressing on the roller of the first unit, so that the said roller will itself press on the cylindrical cam the latter pressing in its turn on the members of the second unit, a spring positioned between the mobile member of one of the two units and the outer ring, for separating the members of the second unit from each other as soon as the control means are no longer actuated, thus freeing the two rings each being locked in the position defined by the location of the hollow of the profile of the corresponding cam, and an abutment for limiting the amplitude of the spacing between the members of the second unit under the action of the spring.

6. Resetting device according to claim 5, in which the second unit is constituted by a roller fixed on the inner ring and by a curvilinear cam cut out of a spherical surface, pivoting about a diameter of the inner ring, this diameter being itself parallel to the pivot of the cylindrical cam, and said curvilinear cam being itself linked to a lever integral with the cylindrical cam and passing through the outer ring.

7. Resetting device according to claim 6, in which a spring is mounted between the curvilinear cam and the outer ring, an abutment provided on the outer ring limiting the space between the members of the second unit.

8. Resetting device according to claim 1, in which the control means is constituted by a lever pivoting about a spindle supported by the casing, one of the extremities of said lever being provided with the roller of the first unit, its other extremity being directly linked to a control rod in its turn provided with a milled knob at its other extremity, a spring interposed between said lever and the casing, in order to maintain in its position of rest the said roller separated from the cylindrical cam.

9. Resetting device according to claim 8, in which one of the extremities of the lever is provided with a block within which slides the control rod, the movements of the latter controlling the said block through the instrumentality of a spring bearing against a shoulder on the rod, a second spring interposed between the extremity of the rod and the casing, for maintaining in the position of rest the roller separated from the cylindrical cam.

References Cited in the file of this patent

UNITED STATES PATENTS 2,641,133     Barkalow et al.            June 9, 1953

FOREIGN PATENTS 135,487     Sweden                Apr. 29, 1952